(12) United States Patent
Matsumoto et al.

(10) Patent No.: US 7,721,599 B2
(45) Date of Patent: May 25, 2010

(54) REDUCED RESISTANCE THERMAL FLOW MEASUREMENT DEVICE

(75) Inventors: Masahiro Matsumoto, Hitachi (JP);
Hiroshi Nakano, Hitachi (JP);
Masamichi Yamada, Hitachinaka (JP);
Keiji Hanzawa, Mito (JP); Izumi Watanabe, Hitachinaka (JP); Keiichi Nakada, Schwaig-Oberding (DE);
Yasuhiro Kanamaru, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 245 days.

(21) Appl. No.: 11/814,308

(22) PCT Filed: Feb. 20, 2006

(86) PCT No.: PCT/JP2006/302923

§ 371 (c)(1),
(2), (4) Date: Jul. 19, 2007

(87) PCT Pub. No.: WO2006/100855

PCT Pub. Date: Sep. 28, 2006

(65) Prior Publication Data

US 2009/0000372 A1    Jan. 1, 2009

(30) Foreign Application Priority Data

Mar. 18, 2005  (JP) .............................. 2005-078382

(51) Int. Cl.
*G01F 1/68* (2006.01)

(52) U.S. Cl. .................................................. 73/204.26
(58) Field of Classification Search ....................... None
See application file for complete search history.

(56) References Cited

U.S. PATENT DOCUMENTS

| | | | | |
|---|---|---|---|---|
| 5,243,858 A | * | 9/1993 | Erskine et al. | 73/204.26 |
| 5,390,141 A | * | 2/1995 | Cohen et al. | 365/96 |
| 5,719,333 A | * | 2/1998 | Hosoi et al. | 73/514.05 |

(Continued)

FOREIGN PATENT DOCUMENTS

EP    543 413    5/1993

(Continued)

*Primary Examiner*—Harshad Patel
(74) *Attorney, Agent, or Firm*—Mattingly & Malur, P.C.

(57) ABSTRACT

Conventional thermal flow measurement devices lack consideration for automobiles in severe environments. A detection element of the thermal flow measurement device according to the present invention is structured by the provision of a planar substrate made of a material having good thermal conductivity, such as silicon or ceramic, with a thin-walled portion (diaphragm). On the surface of the thin-walled portion, the detection element comprises a heat element as a heater heated to a temperature being different to a predetermined extent from the temperature of the air flow to be measured, temperature-detecting resistors as temperature-detecting means on both sides of the heat element, wiring portions formed of electrical conductors that draw signal lines from the heat element and the temperature-detecting resistors and that have a melting point of 2000° C. or higher, and pads.

10 Claims, 14 Drawing Sheets

U.S. PATENT DOCUMENTS

| | | | | |
|---|---|---|---|---|
| 5,945,601 | A * | 8/1999 | Hosoi et al. | 73/514.33 |
| 6,037,045 | A * | 3/2000 | Fukaya | 428/210 |
| 6,259,350 | B1 | 7/2001 | Mueller-Fiedler et al. | |
| 6,278,379 | B1 * | 8/2001 | Allen et al. | 340/870.16 |
| 6,319,757 | B1 * | 11/2001 | Parsons et al. | 438/127 |
| 6,911,714 | B2 * | 6/2005 | Parsons et al. | 257/470 |
| 6,925,866 | B2 * | 8/2005 | Watanabe et al. | 73/204.26 |
| 6,988,399 | B1 * | 1/2006 | Watanabe et al. | 73/204.26 |
| 7,104,126 | B2 * | 9/2006 | Watanabe et al. | 73/204.26 |
| 7,152,478 | B2 * | 12/2006 | Peterson et al. | 73/715 |
| 7,538,401 | B2 * | 5/2009 | Eriksen et al. | 257/419 |
| 2001/0004263 | A1 * | 6/2001 | Ishinaga et al. | 347/14 |
| 2004/0040382 | A1 * | 3/2004 | Peterson et al. | 73/708 |
| 2004/0211253 | A1 * | 10/2004 | Horie et al. | 73/204.15 |
| 2005/0268713 | A1 * | 12/2005 | Watanabe et al. | 73/204.26 |
| 2006/0272403 | A1 * | 12/2006 | Watanabe et al. | 73/204.26 |
| 2008/0047341 | A1 * | 2/2008 | Kanamaru et al. | 73/204.26 |
| 2008/0168650 | A1 * | 7/2008 | Sakuma | 29/612 |
| 2008/0282791 | A1 * | 11/2008 | Nakano et al. | 73/202.5 |
| 2009/0188314 | A1 * | 7/2009 | Sakuma | 73/204.26 |

FOREIGN PATENT DOCUMENTS

| | | |
|---|---|---|
| JP | 8-166270 | 6/1996 |
| JP | 09-243413 | 9/1997 |
| JP | 11-237266 | 8/1999 |
| JP | 2000-002571 | 1/2000 |
| JP | 2001-165733 | 6/2001 |
| JP | 2003-149025 | 5/2003 |

* cited by examiner

REDUCED RESISTANCE THERMAL FLOW MEASUREMENT DEVICE

TECHNICAL FIELD

The present invention relates to thermal flow measurement devices.

BACKGROUND ART

In convention examples relating to material for a wiring portion of a thermal flow measurement device comprising a heater and temperature detecting means disposed on both sides of the heater, as in a thermal air flow sensor and internal combustion engine control device described in Patent Document 1 mentioned below, a metal having a low melting point, such as aluminum or gold, is used for such wiring portion. Alternatively, polysilicon is used for the wiring portion, as in a thermal air flow sensor and internal combustion engine control device also described in Patent Document 1. As another alternative, a diffused resistor is used for the wiring portion, as in a semiconductor sensor device described in Document 2 mentioned below.

Examples of Patent Documents relating to the above technology are listed below:

Patent Document 1: JP Patent Publication (Kokai) No. 2002-48616 A

Patent Document 2: JP Patent Publication (Kokai) No. 2004-279038 A

When the thermal flow measurement device comprising a heater and temperature detecting means disposed on both sides of the heater is used as a flow measurement device for measuring engine intake air quantity, the environment in which the flow measurement device is disposed is very severe. This is because, in order to allow the thermal flow measurement device to measure air flow quantity, the engine intake air flow needs to come into direct contact with the surface of the detection element of the thermal flow measurement device. Conventional examples using metals having low melting points, such as aluminum or gold, for wiring portions lack consideration with respect to such point.

Engine intake air contains a great deal of dust, and the dust collides with the surface of the detection element of the thermal flow measurement device, resulting in destruction of the protective film on the surface of the detection element. In particular, when a metal material having a low melting point is used for the wiring material, the film quality of such protective film becomes poor and mechanically fragile. Further, an acid, such as sulfuric acid, nitric acid, or hydrochloric acid, contained in gasoline melts the protective film, and a metal such as aluminum corrodes when the acid reaches the inner metal wiring from the portion destroyed due to the above-described collision with dust.

On the other hand, conventional examples using polysilicon or diffused resistors for wiring portions are advantageous in terms of the above problems, since silicon has resistance to acid. However, since silicon has higher resistivity than metal, it also has higher wiring resistance. Such wiring resistance decreases the sensitivity of the thermal flow measurement device, and fluctuation in wiring resistance causes difference of characteristics. Still further, unnecessary heat generation is caused, thereby deteriorating the characteristics of the thermal flow measurement device. Further, silicon has a piezoresistive effect and a resistance value fluctuates with the influence of mounting stress, resulting in deterioration of characteristics.

The present invention has been made in view of the above circumstances, and it is an object of the present invention to provide a thermal flow measurement device that can suppress damage to sensor portions even in the above severe use environment and that can reduce wiring resistance.

DISCLOSURE OF THE INVENTION

The above problems are solved by forming a wiring portion electrically connected to a thermal flow measurement element comprising a heater that generates heat when a current is caused to flow therethrough and temperature detecting means located near the heater, with an electrical conductor having a melting point of 2000° C. or higher.

In accordance with the present invention, the characteristics of the thermal flow measurement device are improved by reducing the wiring resistance thereof, and a highly reliable thermal flow measurement device that can be used even in a severe environment for automobiles can be provided.

BEST MODES FOR CARRYING OUT THE INVENTION

Embodiments of the present invention will be described hereafter with reference to the drawings.

Figure 1:
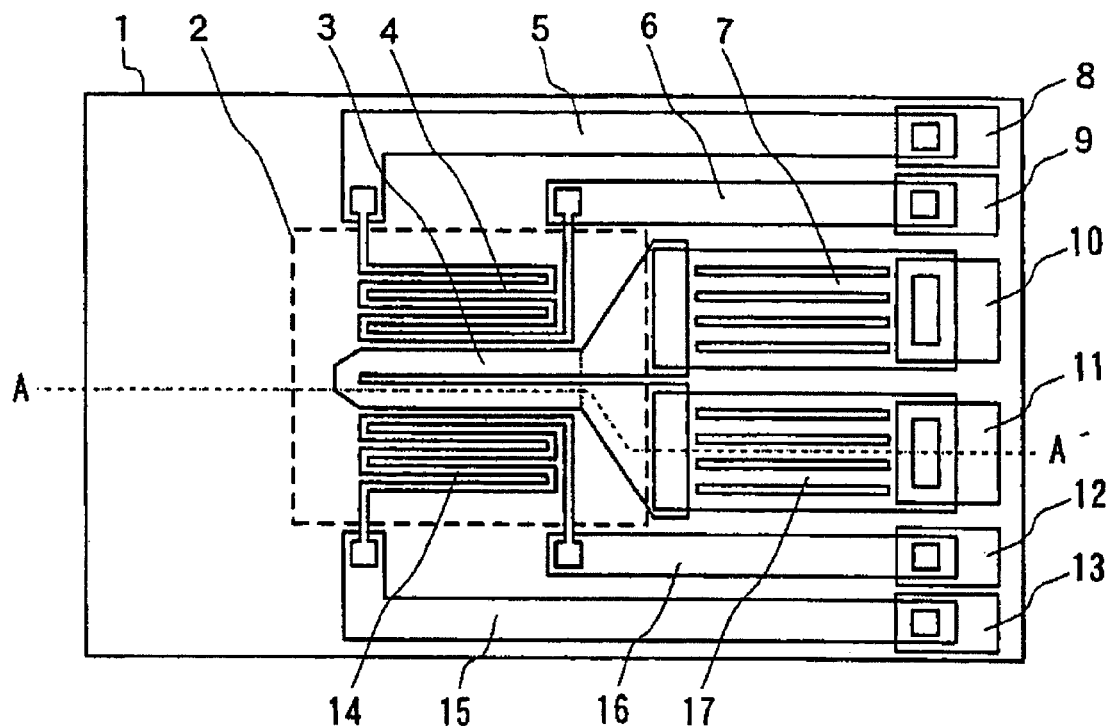
FIG. 1 shows a plan view of a detection element 1 of a thermal flow measurement device of a first embodiment of the present invention.
Figure 2:
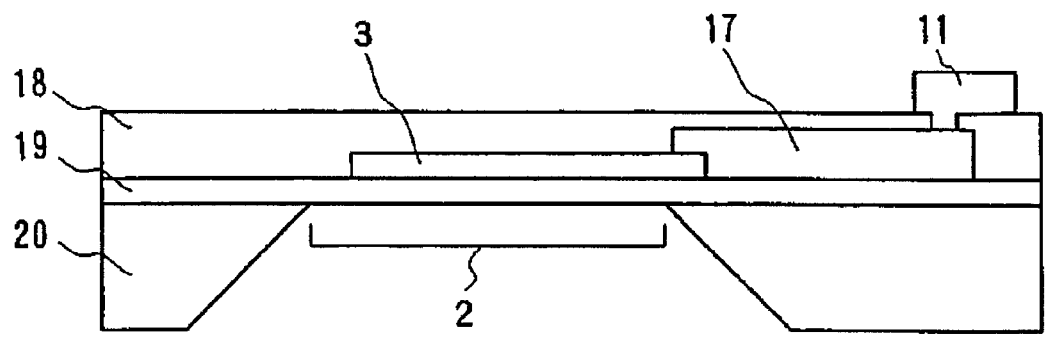
FIG. 2 shows a cross-sectional view taken along A-A' of the detection element 1 of the thermal flow measurement device of the first embodiment.

First, a thermal flow measurement device of a first embodiment of the present invention will be described with reference to FIGS. 1 and 2. FIG. 1 shows a plan view of a detection element 1 of the thermal flow measurement device of the first embodiment, and FIG. 2 shows a cross-sectional view taken along A-A' of the detection element 1 of the thermal flow measurement device.

First, the structure of the detection element 1 of the present thermal flow measurement device will be described with reference to FIGS. 1 and 2. In order to form the detection element 1, an insulating film 19 is formed on a planar substrate 20 made of a material having good thermal conductivity such as silicon or ceramic, and etching is conducted on the back side of the planar substrate 20 so as to form space under the insulating film 19. As a result, the planar substrate 20 is provided with a thin-walled portion (diaphragm) 2. On the surface of the thin-walled portion 2, there are formed a heat element 3 as a heater heated to a temperature being different to a predetermined extent from the temperature of air flow to be measured and temperature-detecting resistors 4 and 14 as temperature detecting means on both sides of the heat element 3. The heat element 3 is a resistor made of polysilicon thin film, platinum thin film, nickel alloy thin film, or the like, and it generates heat when a current is caused to flow therethrough. The temperature-detecting resistors 4 and 14 are also resistors made of polysilicon thin film, platinum thin film, nickel alloy thin film, or the like. The resistance of these resistors 4 and 14 varies depending on temperature, and therefore such characteristics are used for detecting the temperature of the locations at which the temperature-detecting resistors 4 and 14 are disposed. Further, the heat element 3 and the temperature-detecting resistors 4 and 14 are connected to pads 8, 9, 10, 11, 12, and 13 via wiring portions 5, 6, 7, 15, 16, and 17, so that the wiring can be in communication with the outside. Furthermore, the heat element 3, the temperature-detecting resistors 4 and 14, and the wiring portions 5, 6, 7, 15, 16, and 17 are coated with a protective film 18.

In the present embodiment, electrical conductors, such as metal (tantalum, molybdenum, tungsten, or the like) having a melting point of 2000° C. or higher, silicide (tantalum silicide, molybdenum silicide, tungsten silicide, or the like) having a melting point of 2000° C. or higher, or nitride (tantalum nitride, molybdenum nitride, tungsten nitride, or the like) having a melting point of 2000° C. or higher, was used for the wiring portions 5, 6, 7, 15, 16, and 17. In this way, it is possible to conduct thermal treatment at high temperature for making the protective film 18. Thus, the protective film 18 can be formed as a dense film, such that a protective film 18 (silicon oxide film, silicon nitride film, or the like) having strong acid resistance and strong mechanical strength can be obtained. Since the resistivity of electrical conductors, such as metal, silicide, and nitride, which are materials used herein for wiring portions, is 1/10 to 1/100 of polysilicon, negative effects (decrease of sensitivity, variation of characteristics, generation of heat, and the like) due to the wiring resistance of the wiring portions can be reduced. Further, portions in which wires are thick, such as the wiring portions 7 and 17, are provided with slits. The reason why the slits are formed is to prevent peeling of wires having large widths, since electrical conductor films having high melting points are generally rigid and therefore have large stress.

Figure 3:
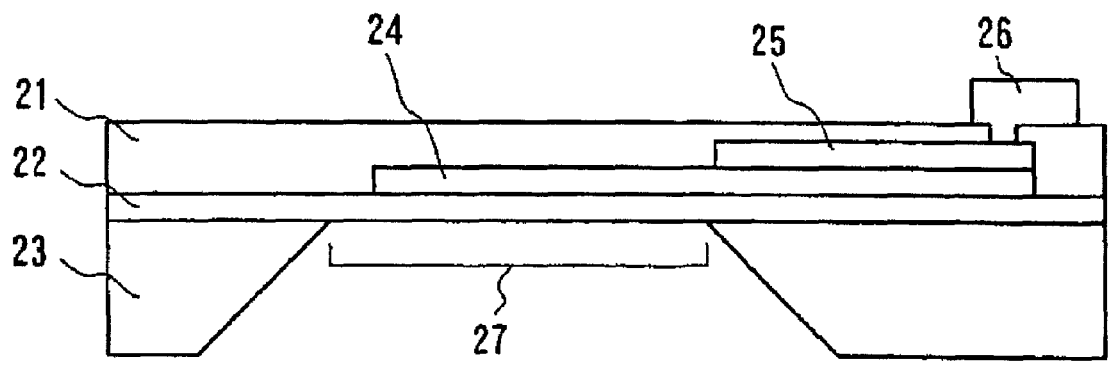
FIG. 3 shows a cross-sectional view of a detection element of a thermal flow measurement device of a second embodiment.

Next, a thermal flow measurement device of a second embodiment of the present invention will be described with reference to FIG. 3. FIG. 3 is a cross-sectional view of a detection element of the thermal flow measurement device of the second embodiment.

The cross-sectional structure of the detection element of the present thermal flow measurement device is approximately the same as that of the detection element 1 of the thermal flow measurement device of the first embodiment described above. In order to form the present detection element, an insulating film 22 is formed on a planar substrate 23 made of a material having good thermal conductivity such as silicon or ceramic, and etching is conducted on the back side of the planar substrate 23 so as to form space under the insulating film 22. As a result, the planar substrate 23 is provided with a thin-walled portion (diaphragm) 27. On the surface of the thin-walled portion 27, there are formed a polysilicon thin film 24 forming a heat element as a heater heated to a temperature being different to a predetermined extent from the temperature of air flow to be measured and temperature-detecting resistors as temperature detecting means on both sides of the heat element; a metal thin film 25 (tantalum, molybdenum, tungsten, or the like) having a melting point of 2000° C. or higher at a portion corresponding to the wiring portions of the heat element and the temperature-detecting resistors; a pad 26 for obtaining a terminal from the metal thin film 25; and a protective film 21.

In the present embodiment, the metal thin film 25 is stacked on the portion corresponding to the wiring portions of the heat element and the temperature-detecting resistors of the polysilicon thin film 24, and part of the polysilicon thin film 24 is caused to change into silicide by treating it with heat. By using silicide for the portion corresponding to the wiring portions of the heat element and the temperature-detecting resistors of the polysilicon thin film 24 as in the present embodiment, the electrical resistance of the wiring portions can be reduced and negative effects (decrease of sensitivity, variation of characteristics, generation of heat, and the like) resulting from wiring resistance can be reduced. Further, by using a material having a melting point of 2000° C. or higher for the metal thin film 25, the protective film 21 can be made dense, and thus the acid resistance and mechanical strength of the protective film 21 can be improved.

Figure 4:
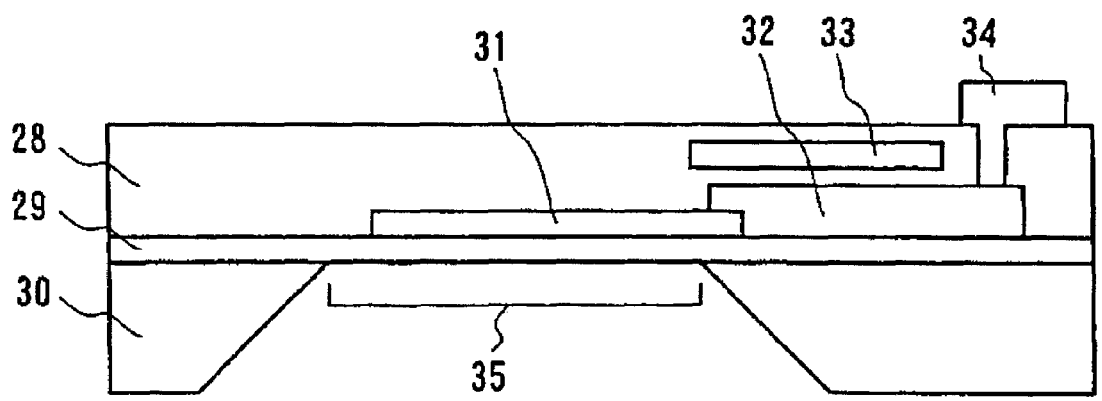
FIG. 4 shows a cross-sectional view of a detection element of a thermal flow measurement device of a third embodiment.

Next, a thermal flow measurement device of a third embodiment of the present invention will be described with reference to FIG. 4. FIG. 4 is a cross-sectional view of a detection element of the thermal flow measurement device of the third embodiment.

The cross-sectional structure of the detection element of the thermal flow measurement device of the present embodiment is approximately the same as that of the detection element 1 of the thermal flow measurement device of the first embodiment described above. In order to form the present detection element, an insulating film 29 is formed on a planar substrate 30 made of a material having good thermal conductivity such as silicon or ceramic, etching is conducted on the back side of the planar substrate 30 so as to form space under the insulating film 29, and as a result, the planar substrate 30 is provided with a thin-walled portion (diaphragm) 35. On the surface of the thin-walled portion 35, there are formed: a polysilicon thin film 31 forming a heat element as a heater heated to a temperature being different to a predetermined extent from the temperature of air flow to be measured and temperature-detecting resistors as temperature detecting means on both sides of the heat element; a metal thin film 32 (tantalum, molybdenum, tungsten, or the like) at a portion corresponding to the wiring portions of the heat element and the temperature-detecting resistors; a pad 34 for obtaining a terminal from the metal thin film 32; a polysilicon thin film 33 with which the metal thin film 32 is coated; and a protective film 28.

In the present embodiment, the metal thin film 32 is coated with the polysilicon thin film 33 having resistance to acid, and the metal thin film 32 is thus protected. In this way, the metal thin film 32 is protected from corrosion due to acid. By using the metal thin film 32 having a low electrical resistivity for the wiring portion of the heat element and the temperature-detecting resistors, reduction in wiring resistance can be realized, and thus, negative effects (decrease of sensitivity, variation of characteristics, generation of heat, and the like) resulting from wiring resistance can be reduced. Further, as in the present embodiment, by protecting the metal thin film 32 with the polysilicon thin film 33, it becomes possible to use aluminum or platinum, each of which has a lower melting point, for the metal thin film 32. Particularly, since aluminum has a low stress and is soft, a thicker film can be made, and, as a result, wiring resistance can be decreased further.

Figure 5:
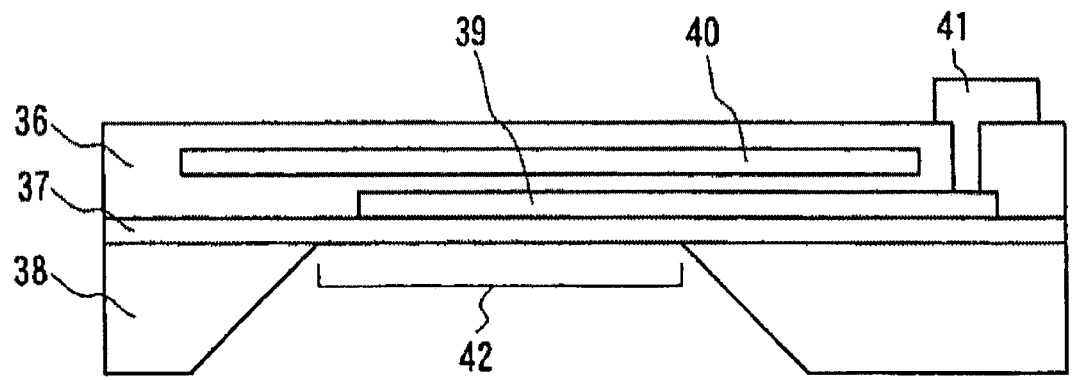
FIG. 5 shows a cross-sectional view of a detection element of a thermal flow measurement device of a fourth embodiment.

Next, a thermal flow measurement device of a fourth embodiment of the present invention will be described with reference to FIG. 5. FIG. 5 shows a cross-sectional view of a detection element of the thermal flow measurement device of the fourth embodiment.

The cross-sectional structure of the detection element of the thermal flow measurement device of the present embodiment is approximately the same as that of the detection element 1 of the thermal flow measurement device of the first embodiment described above. In order to form the present detection element, an insulating film 37 is formed on a planar substrate 38 made of a material having good thermal conductivity such as silicon or ceramic, etching is conducted on the back side of the planar substrate 38 so as to form space under the insulating film 37, and as a result, the planar substrate 38 is provided with a thin-walled portion (diaphragm) 42. On the surface of the thin-walled portion 42, there are formed: a metal thin film 39 (tantalum, molybdenum, tungsten, platinum, or the like) forming a heat element as a heater heated to a temperature being different to a predetermined extent from the temperature of air flow to be measured and temperature-detecting resistors as temperature detecting means on both sides of the heat element; a pad 41 for obtaining a terminal from the metal thin film 39; a polysilicon thin film 40 for protecting the metal thin film 39; and a protective film 36.

In the present embodiment, the metal thin film 39 is coated with the polysilicon thin film 40 having resistance to acid, and thus the metal thin film 39 is protected from corrosion due to acid. Thus, even when metal is used as a material for the heat element and the temperature-detecting resistors, resistance to acid can be assured. Further, based on the thermal flow measurement device as in the present embodiment, the higher the thermal insulation property of the thin-walled portion 42, the higher the sensitivity to the quantity of flow will be. For this reason, it is preferable that the thermal conductivity of the film forming the thin-walled portion 42 be high. Polysilicon is very suitable for this purpose; the thermal conductivity thereof is $1/10$ of that of metal material. Namely, the polysilicon thin film 40 can protect the metal thin film 39 without deterioration of sensor characteristics. Further, by performing implantation with respect to the polysilicon thin film 40 and allowing the polysilicon thin film 40 to have electrical conduction properties, it becomes possible to realize electrostatic shielding, making it strong with respect to exogenous noise.

Figure 6:
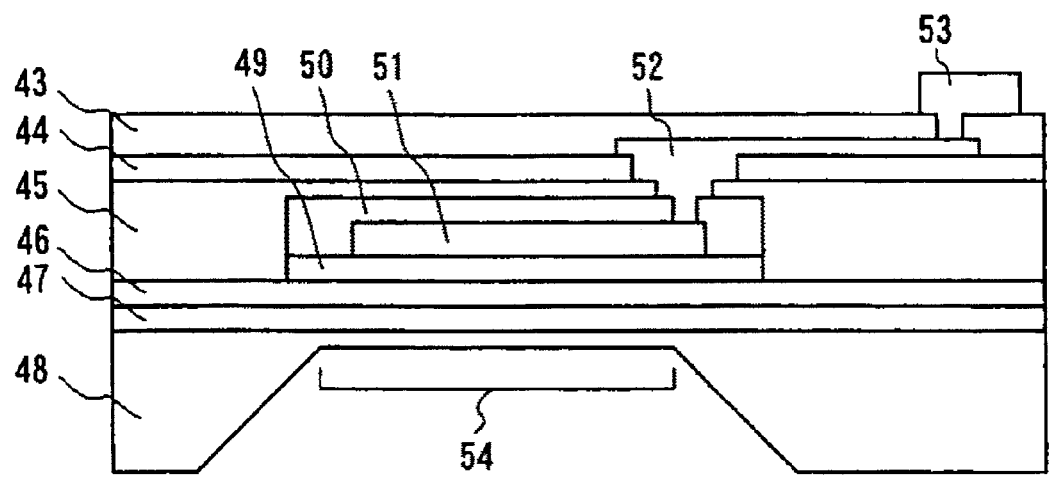
FIG. 6 shows a cross-sectional view of a detection element of a thermal flow measurement device of a fifth embodiment.

Next, a thermal flow measurement device of a fifth embodiment of the present invention will be described with reference to FIG. 6. FIG. 6 shows a cross-sectional view of a detection element of the thermal flow measurement device of the fifth embodiment.

The cross-sectional structure of the detection element of the thermal flow measurement device of the present embodiment is approximately the same as that of the detection element 1 of the thermal flow measurement device of the first embodiment described above. In order to form the present detection element, a silicon oxide film 47 and a silicon nitride film 46 are formed on a planar substrate 48 made of a material having good thermal conductivity such as silicon or ceramic, a polysilicon thin film 51 comprising a heat element and temperature-detecting resistors is formed thereabove, and silicon oxide films 49 and 50 are formed on and underneath the polysilicon thin film 51 so that the polysilicon thin film 51 is surrounded by the silicon oxide films 49 and 50. Further, by forming a silicon nitride film 45 thereon, the polysilicon thin film 51 is completely surrounded by the silicon nitride films 45 and 46. In this way, the entry of hydrogen, which is a cause of temporal change in the resistance of the polysilicon thin film 51, can be blocked by the silicon nitride films 45 and 46 (A silicon nitride film is a material having a low hydrogen transmittance.) Further, a silicon oxide film 44 was formed on the silicon nitride film 45, a contact hole was made in the silicon oxide film 44, the silicon nitride film 45, and the silicon oxide film 50 for drawing out wiring from the polysilicon thin film 51, and a metal wire 52 was provided therein. Since metal is a material exhibiting low hydrogen transmittance, the entry of hydrogen into the polysilicon thin film 51 can be prevented. Note that it is desirable that the metal wire 52 be a metal having a melting point of 2000° C. or higher. This is so that a protective film 43 on the metal wire 52 can be made dense. Further, a pad 53 for drawing out an electrode from the metal wire 52 was provided. Further, etching is conducted on the back side of the planar substrate 48 so as to form space under the silicon oxide film 47, and thus, a planar substrate 48 was provided with a thin-walled portion (diaphragm) 54.

In the present embodiment, the periphery of the polysilicon thin film 51 was completely surrounded by the silicon nitride films 46 and 45 and the metal wire 52, so as to prevent the entry of hydrogen, which is a cause of change in the resistance of the polysilicon thin film 51.

Figure 7:
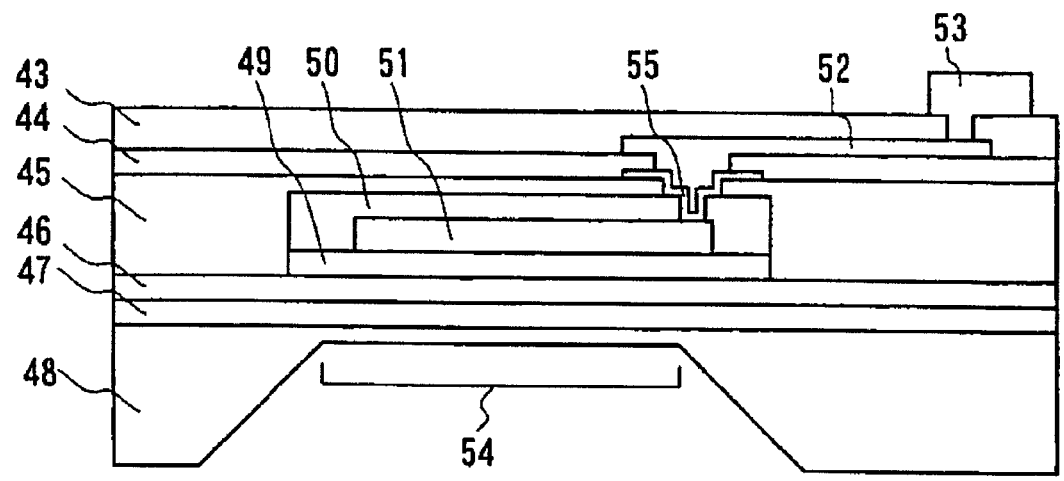
FIG. 7 shows a cross-sectional view of a detection element of a thermal flow measurement device of a sixth embodiment.

Next, a thermal flow measurement device of a sixth embodiment of the present invention will be described with reference to FIG. 7. FIG. 7 is a cross-sectional view of a detection element of the thermal flow measurement device of the sixth embodiment.

While the cross-sectional structure of the detection element of the thermal flow measurement device of the present embodiment is approximately the same as that of the detection element of the thermal flow measurement device of the fifth embodiment described above, it differs in the structure of the draw-out portion of the metal wire. In the fifth embodiment, since a contact hole was made in the films of different materials, such as in the silicon oxide film 44, the silicon nitride film 45, and the silicon oxide film 50, the cross-sectional shape of the contact hole is caused to have an overhang, and therefore it is problematic in that adhesion between the metal wire 52 and the contact hole is poor. For this reason, a metal thin film 55 is provided in the present embodiment so as to solve the problem.

Figure 8:
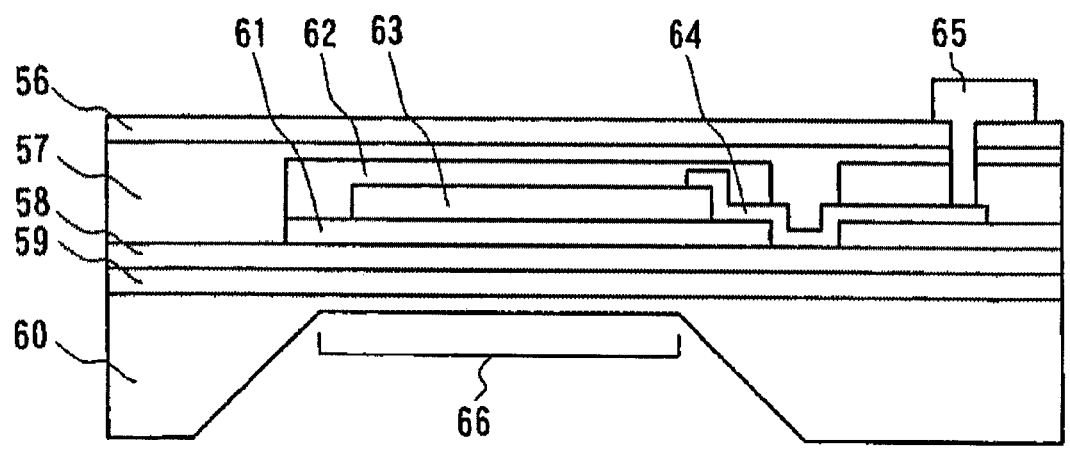
FIG. 8 shows a cross-sectional view of a detection element of a thermal flow measurement device of a seventh embodiment.

Next, a thermal flow measurement device of a seventh embodiment of the present invention will be described with reference to FIG. 8. FIG. 8 shows a cross-sectional view of a detection element of the thermal flow measurement device of the seventh embodiment.

The cross-sectional structure of the detection element of the thermal flow measurement device of the present embodiment is approximately the same as that of the detection element of the thermal flow measurement device of the fifth embodiment described above. In order to form the present detection element, a silicon oxide film 59 and a silicon nitride film 58 are formed on a planar substrate 60 made of a material having good thermal conductivity such as silicon or ceramic, a polysilicon thin film 63 comprising a heat element and temperature-detecting resistors is formed thereabove, and silicon oxide films 61 and 62 are formed on and underneath the polysilicon thin film 63 so that the polysilicon thin film 63 is surrounded by the silicon oxide films 61 and 62. Further, with the formation of a silicon nitride film 57 thereon, the polysilicon thin film 63 is completely surrounded by the silicon nitride film 57 and 58. In this way, the entry of hydrogen, which is a cause of temporal change in the resistance of the polysilicon thin film 63, can be blocked by the silicon nitride films 57 and 58 (a silicon nitride film is a material having a low hydrogen transmittance). Further, a silicon oxide film 56 is formed on the silicon nitride film 57. Regarding a draw-out wire from the polysilicon thin film 63, after the polysilicon thin film 63 was formed, a metal wire 64 was disposed and then provided with a pad 65. Note that it is desirable that the metal wire 64 be a metal having a melting point of 2000° C. or higher. While the silicon nitride film 57 is formed after the metal wire 64 is formed, if the film formation temperature is low, the film quality of the silicon nitride film 57 becomes poor, and as a result, it transmits hydrogen. Thus, in order to improve the film quality of the silicon nitride film 57, it is necessary that the melting point of the metal wire 64 be at least 2000° C. or higher. Further, etching was conducted on the back side of a planar substrate 60 so as to form space under the silicon oxide film 59, and the planar substrate 60 was thus provided with a thin-walled portion (diaphragm) 66.

In the present embodiment, by completely surrounding the periphery of the polysilicon thin film 63 with the silicon nitride films 57 and 58 and the metal wire 64, the entry of hydrogen, which is a cause of change in the resistance of the polysilicon thin film 63, was prevented.

Figure 9:
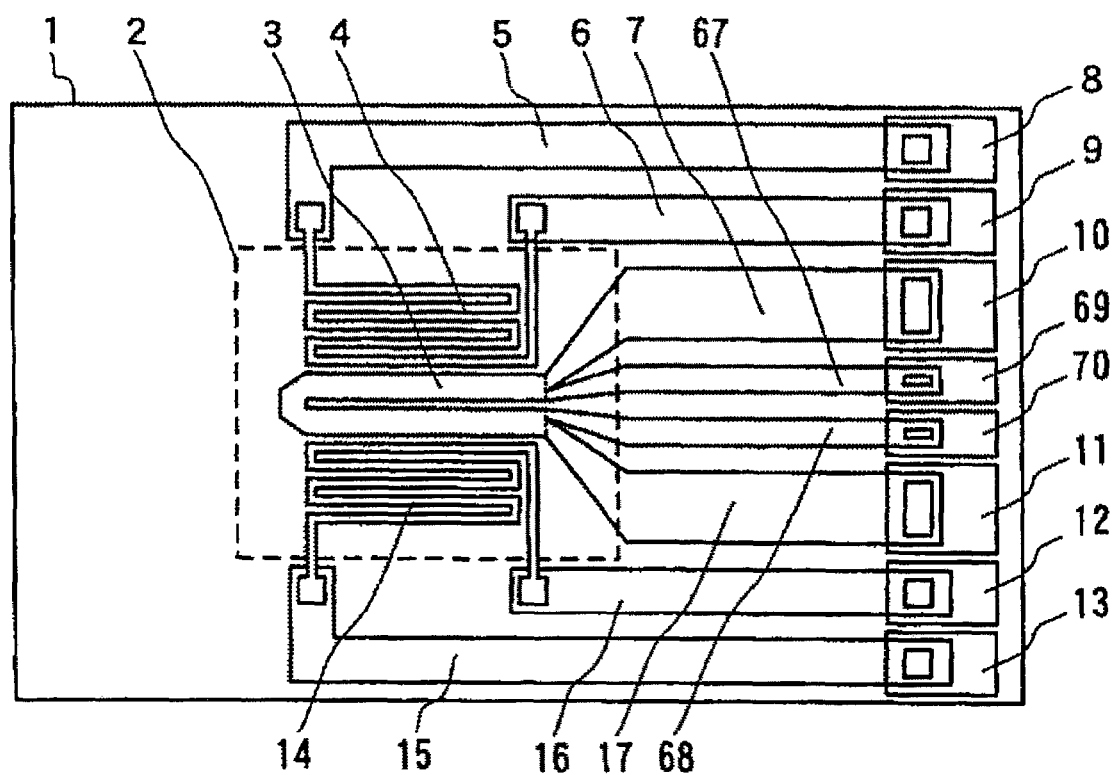
FIG. 9 shows a plan view of a detection element of a thermal flow measurement device of the eighth embodiment.

Next, a thermal flow measurement device of an eighth embodiment of the present invention will be described with reference to FIG. 9. FIG. 9 is a plan view of the detection element of the thermal flow measurement device of the seventh embodiment.

The structure of the detection element of the thermal flow measurement device of the present embodiment is approximately the same as that of the detection element 1 of the thermal flow measurement device of the first embodiment described above; however, wiring portions 67 and 68 of the heat element 3 and pads 69 and 70 for drawing out the wiring portions 67 and 68 are added. In this way, four-point measurement is enabled for measuring the resistance of the heat element 3; the value of resistance of the heat element 3 can be measured more accurately.

Figure 10:
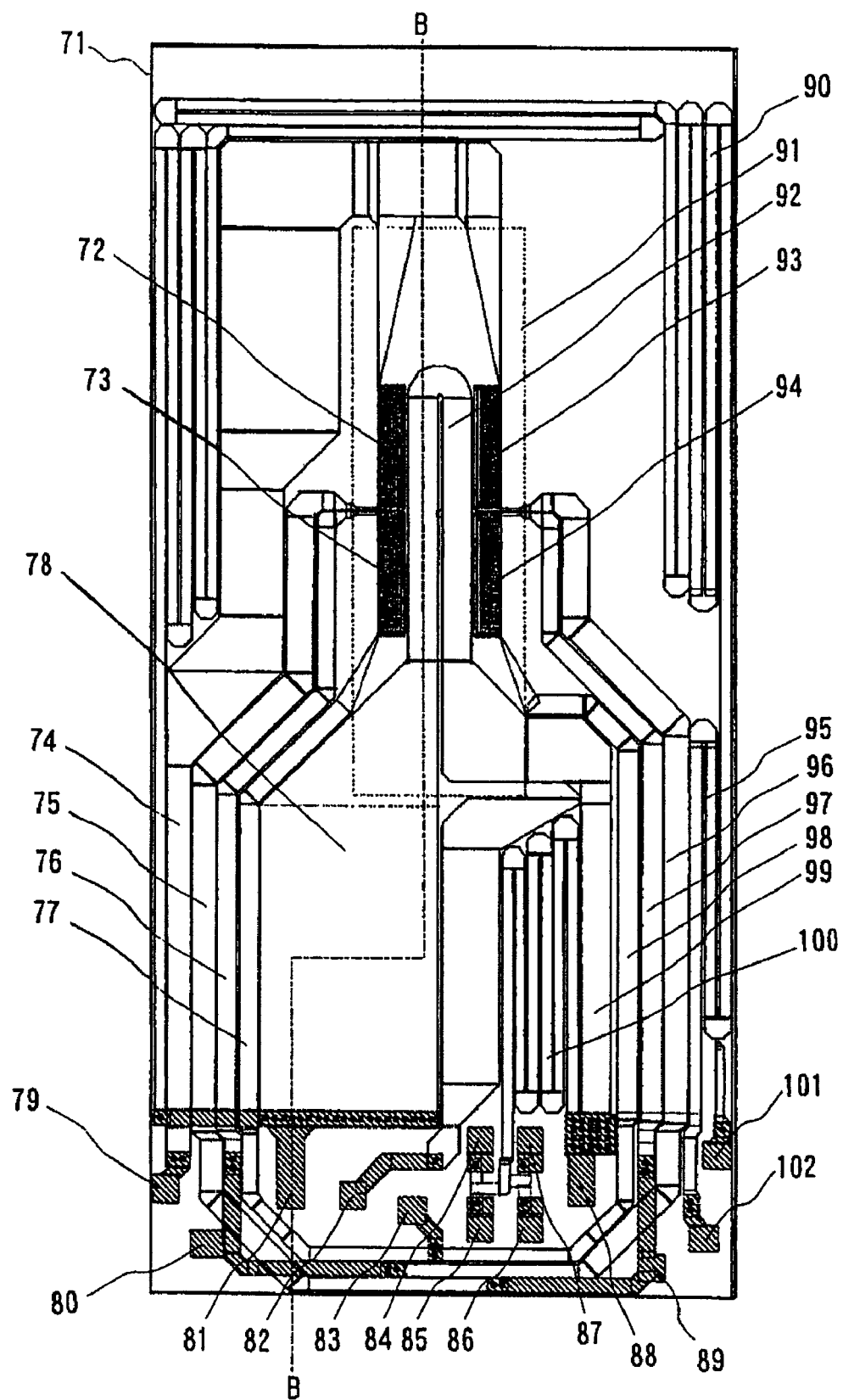
FIG. 10 shows a plan view of a detection element 71 of a thermal flow measurement device of a ninth embodiment.
Figure 11:
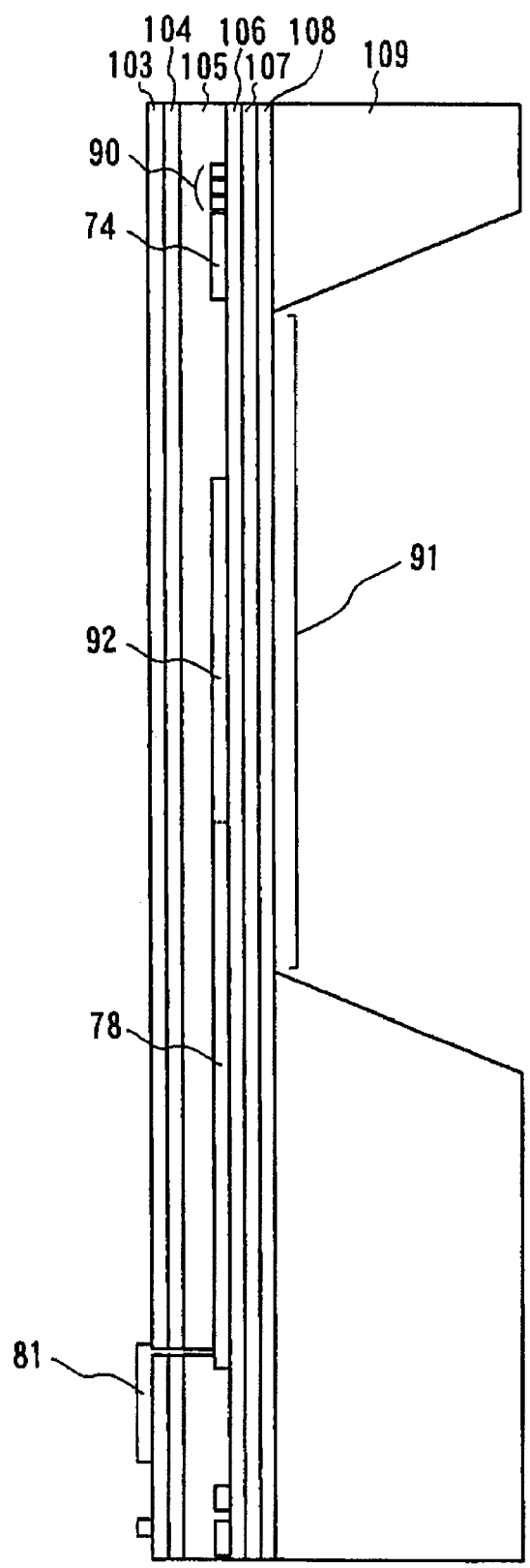
FIG. 11 shows a cross-sectional view taken along B-B' of the detection element 71 of the thermal flow measurement device of the ninth embodiment.
Figure 12:
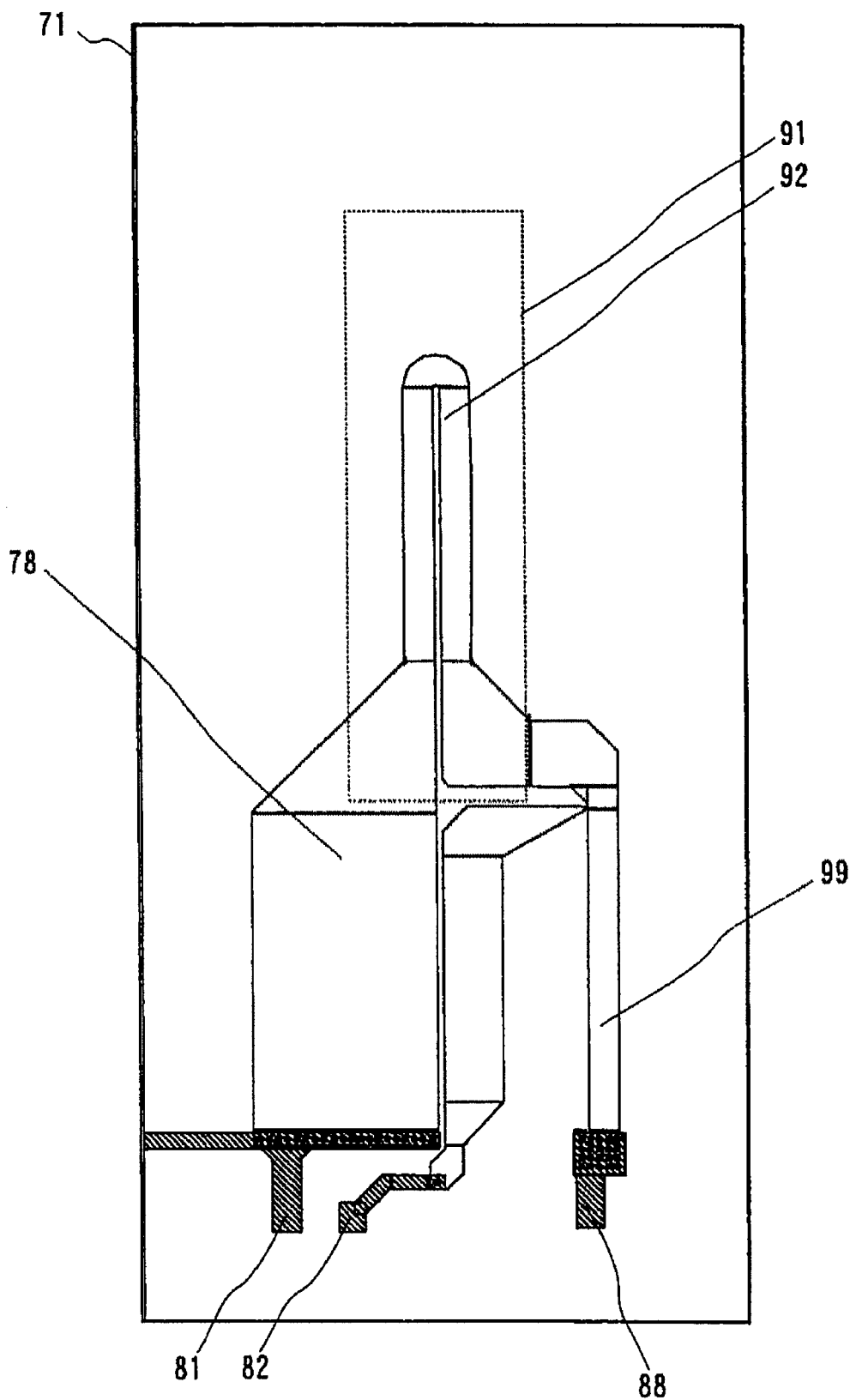
FIG. 12 shows an excerpt portion of a plan view of the detection element 71 of the thermal flow measurement device of the ninth embodiment, the portion relating to a heat element 92.
Figure 13:
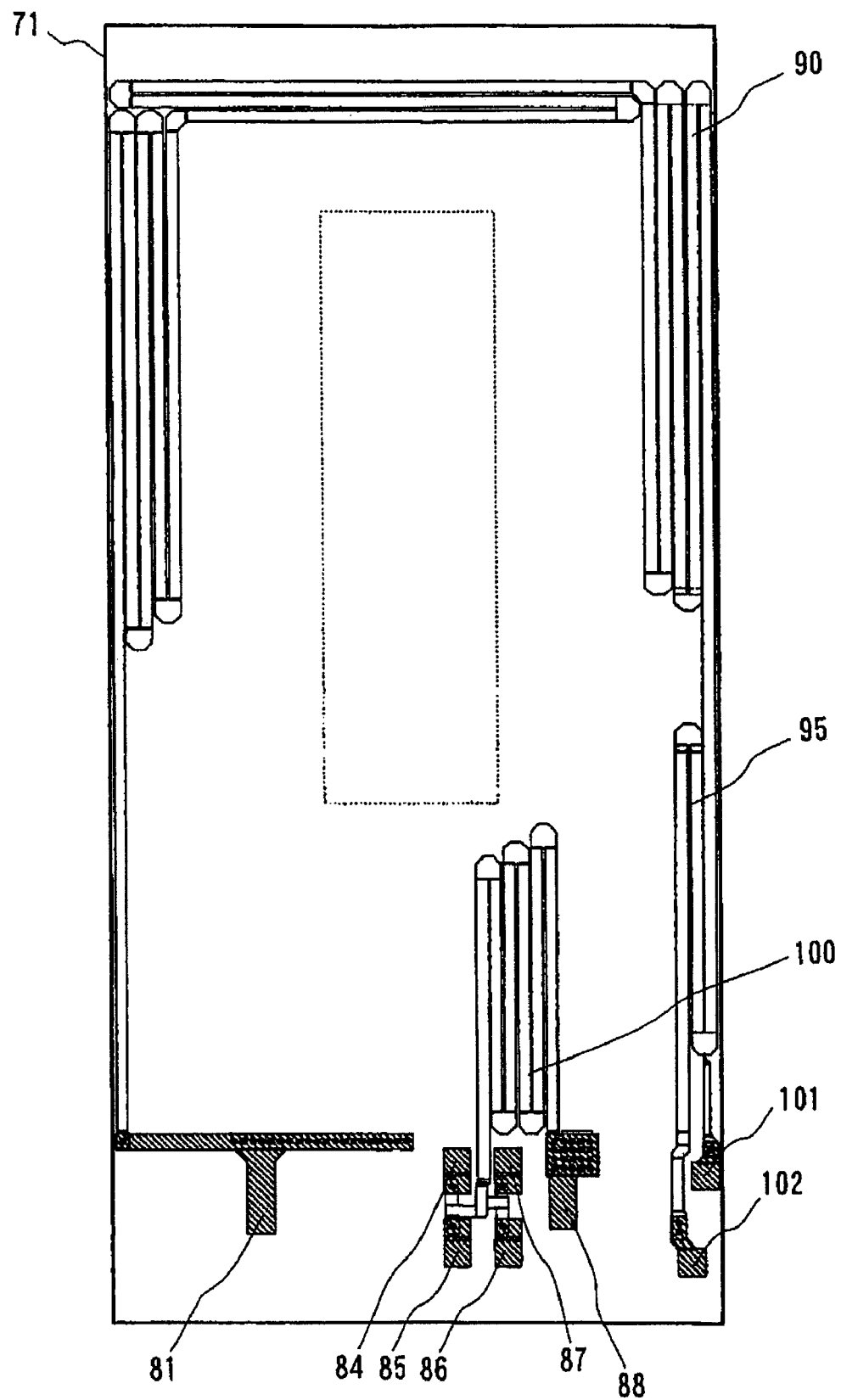
FIG. 13 shows an excerpt portion of a plan view of the detection element 71 of the thermal flow measurement device of the ninth embodiment, the portion relating to an intake-air temperature-detecting resistor 90.
Figure 14:
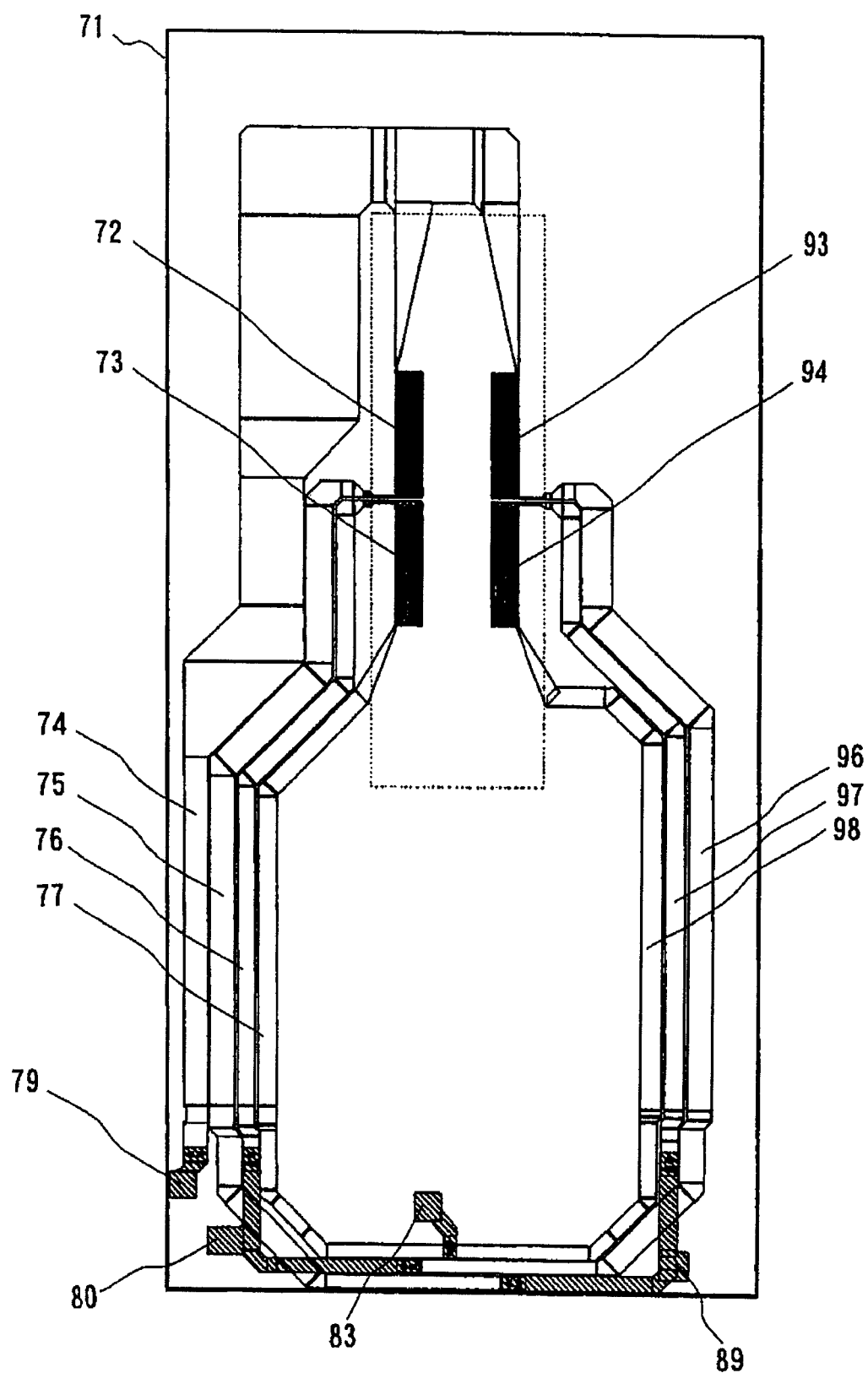
FIG. 14 shows an excerpt portion of a plan view of the detection element 71 of the thermal flow measurement device of the ninth embodiment, the portion relating to temperature difference detecting resistors 72, 73, 93, and 94.
Figure 15:
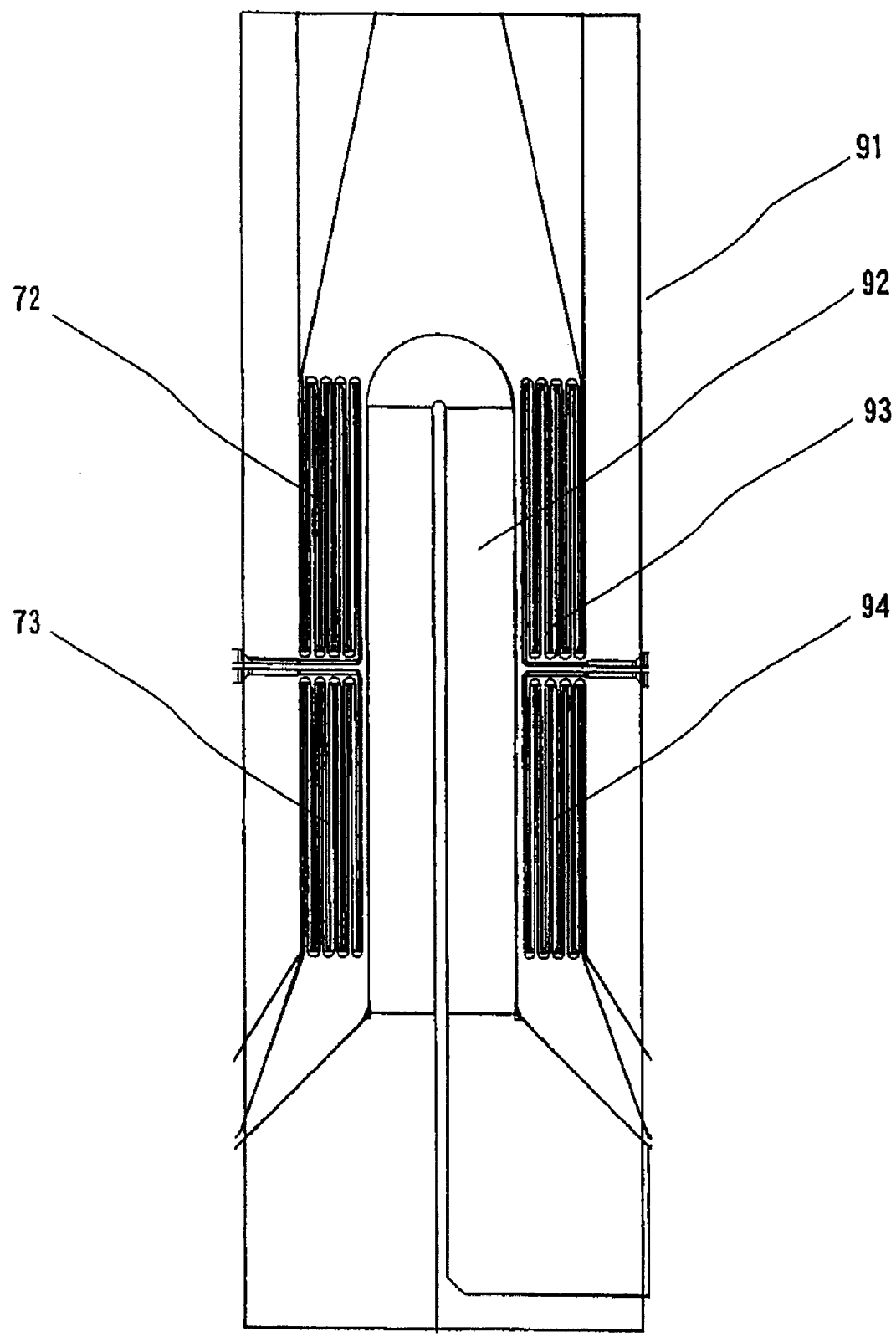
FIG. 15 shows an enlarged view of the vicinity of a diaphragm 91 of the detection element 71 of the thermal flow measurement device of the ninth embodiment.
Figure 16:
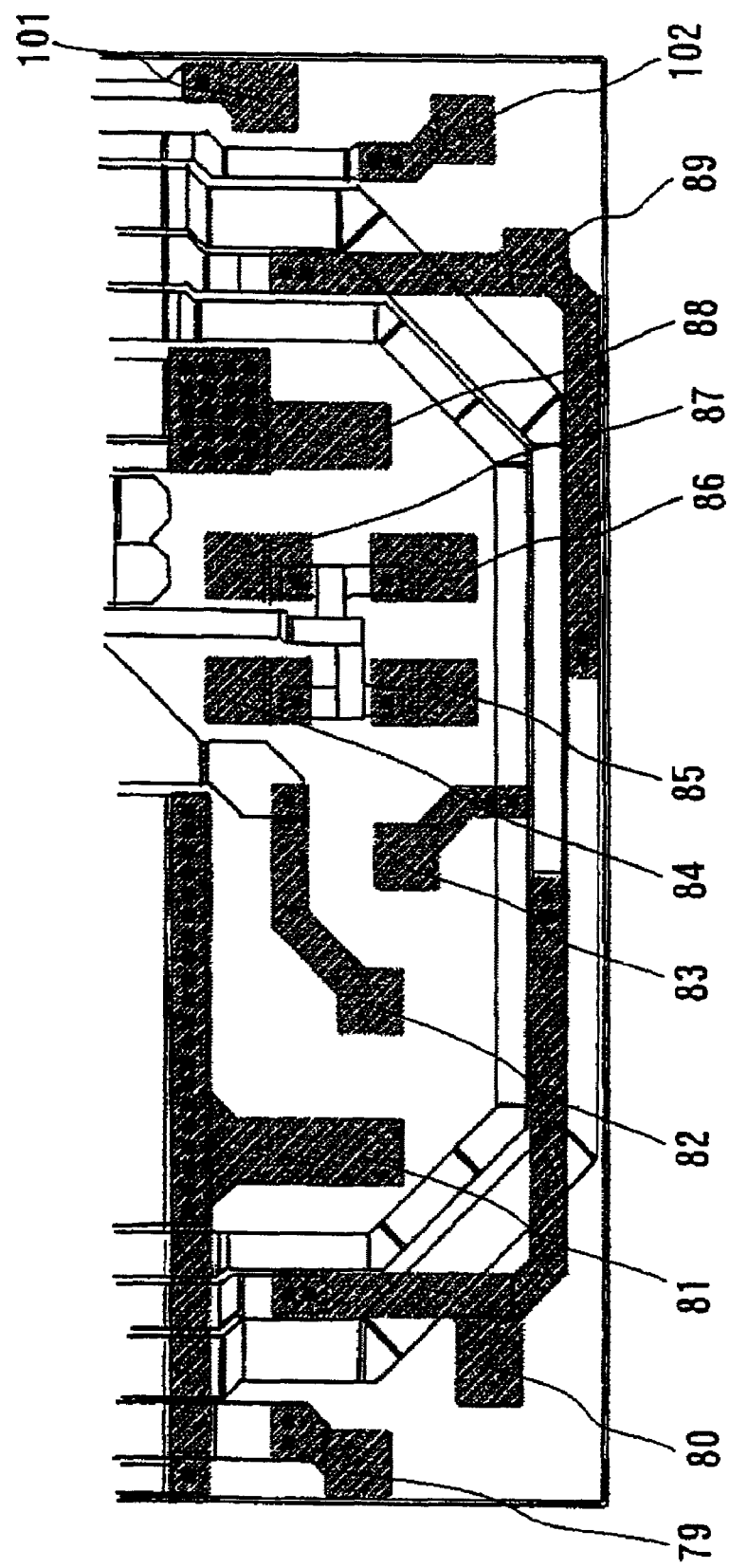
FIG. 16 shows a wiring diagram of the detection element 71 of the thermal flow measurement device of the ninth embodiment.
Figure 17:
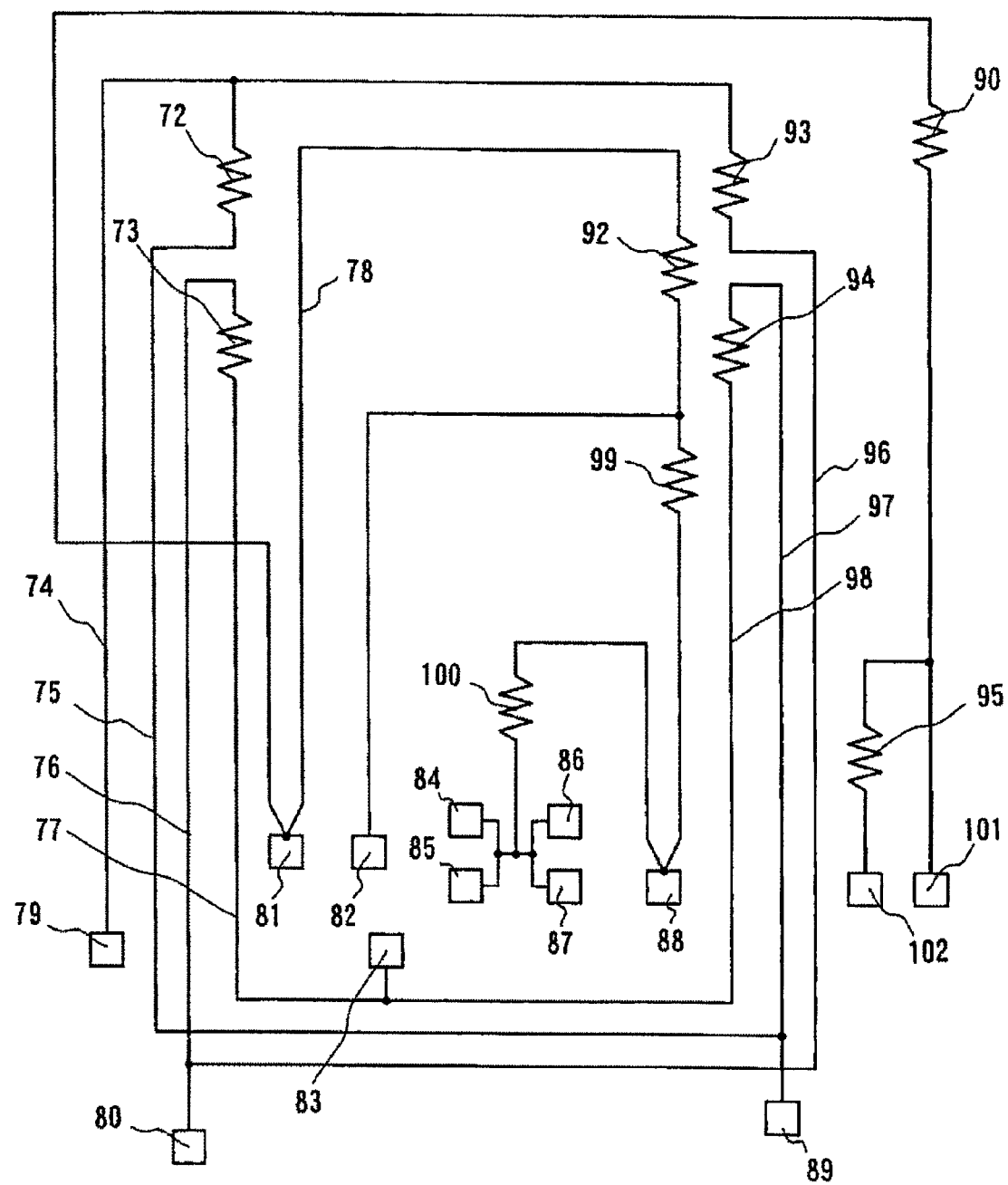
FIG. 17 shows a wiring diagram of the detection element 71 of the thermal flow measurement device of the ninth embodiment.
Figure 18:
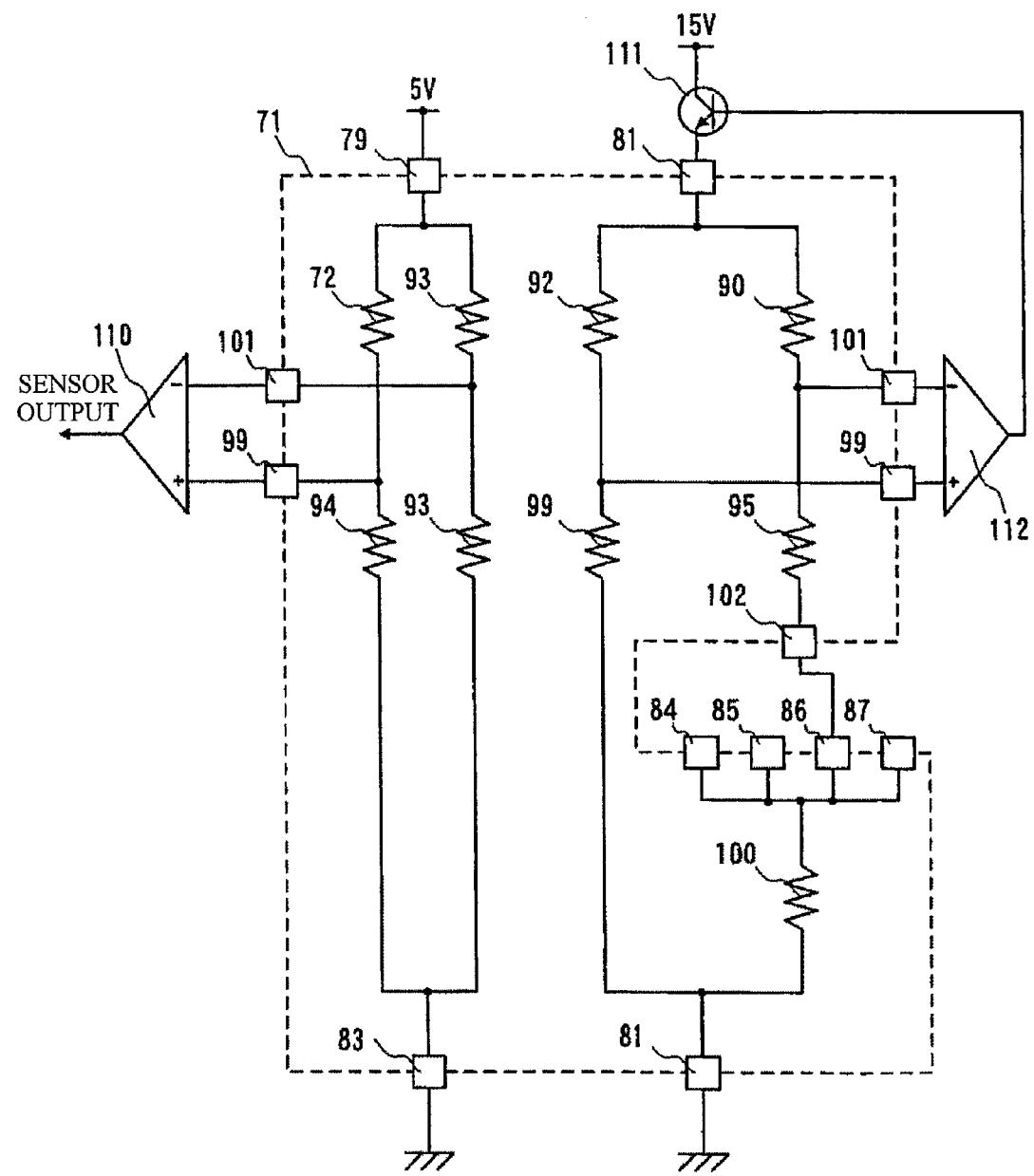
FIG. 18 shows a driving circuit for activating the detection part 71 of the ninth embodiment.

Next, a thermal flow measurement device of a ninth embodiment of the present invention will be described with reference to FIGS. 10, 11, 12, 13, 14, 15, 16, 17, and 18. FIG. 10 shows a plan view of a detection element 71 of the thermal flow measurement device of the ninth embodiment; FIG. 11 shows a cross-sectional view taken along B-B' of the detection element 71 of the thermal flow measurement device of the ninth embodiment; FIG. 12 shows an excerpt portion of the plan view of the detection element 71 of the thermal flow measurement device of the ninth embodiment, the portion relating to a heat element 92; FIG. 13 shows an excerpt portion of a plan view of the detection element 71 of the thermal flow measurement device of the ninth embodiment, the portion relating to an intake-air temperature-detecting resistor 90; FIG. 14 shows an excerpt portion of a plan view of the detection element 71 of the thermal flow measurement device of the ninth embodiment, the portion relating to temperature-difference-detecting resistors 72, 73, 93, and 94; FIG. 15 shows an enlarged view of the vicinity of a diaphragm 91 of the detection element 71 of the thermal flow measurement device of the ninth embodiment; FIG. 16 shows an enlarged view of the vicinity of the pads of the detection element 71 of the thermal flow measurement device of the ninth embodiment; FIG. 17 shows a wiring diagram of the detection element 71 of the thermal flow measurement device of the ninth embodiment; and FIG. 18 shows a driving circuit for activating the detection part 71 of the ninth embodiment.

In order to form the detection element 71 of the thermal flow measurement device of the present embodiment, a silicon oxide film 108, a silicon nitride film 107, and a silicon oxide film 106 are formed on a planar substrate 109 made of a material having good thermal conductivity such as silicon or ceramic, and a polysilicon thin film is laminated thereon. By conducting patterning on the polysilicon thin film, the heat element 92, the intake-air temperature-detecting resistor 90, the temperature-difference-detecting resistors 72, 73, 93, and 94, and the like, are formed. Next, a silicon oxide film 105, a silicon nitride film 104, and a silicon oxide film 103 are formed as protective films, and an aluminum thin film is laminated thereon. Patterning is conducted on the aluminum thin film so as to form wires and pads.

Further, etching is conducted on the back side of the planar substrate 109 so as to form space under the silicon oxide film 108, and the planar substrate 109 is provided with a diaphragm (thin-walled portion) 91. The diaphragm 91 is provided with the heat element 92 as a heater heated to a temperature being different to a predetermined extent from the temperature of air flow to be measured; and the temperature-difference-detecting resistors 72, 73, 93, and 94 as temperature-difference-detecting means on both sides of the heat element 92. Further, one end of the heat element 92 is connected to a pad 81 via a draw-out wire 78, and the other end thereof is connected to a fixed resistor 99. The connection point of the heat element 92 and the fixed resistor 99 is connected to a pad 82, and the other end of the fixed resistor 99 is connected to a pad 88. Further, the temperature-difference-detecting resistors 72, 73, 93, and 94 are connected to the draw-out wires 74, 75, 76, 77, 96, 97, and 98, so that a bridge circuit is formed. The individual connection points of the temperature-difference-detecting resistors 72, 73, 93, and 94 are drawn out to the pads 79, 80, 83, and 89. The heat element 92, the draw-out wire 78, the fixed resistor 99, and the temperature-difference-detecting resistors 72, 73, 93, and 94 are formed by conducting patterning on the polysilicon thin film, and the draw-out wires 74, 75, 76, 77, 96, 97, and 98 are formed by conducting patterning on the polysilicon thin film and the aluminum thin film. The temperature-difference-detecting resistors 72, 73, 93, and 94 form a bridge circuit so as to detect temperature differences between both sides of the heat element 92. However, if the draw-out wires 74, 75, 76, 77, 96, 97, and 98 lack symmetry, errors are generated in the output from the bridge circuit. Thus, the draw-out wires 74, 75, 76, 77, 96, 97, and 98 are structured so that the bridge circuit is symmetrical. Particularly, since it is necessary that the resistance value of the polysilicon thin film portion and the resistance value of the aluminum thin film portion of the draw-out wires 74, 75, 76, 77, 96, 97, and 98 be symmetrical to each other, the detection part is patterned so that the resistance values are equal to each other. This is because, since the temperature coefficient of resistance of the polysilicon thin film and the temperature coefficient of resistance of the aluminum thin film greatly differ, if the resistance value of the polysilicon thin film portion and the resistance value of the aluminum thin film portion were to lack symmetry, a large change in temperature would be caused in the output voltage from the bridge circuit. Further, in order to make the terminal areas (contacts shown as black dots in the figures) of the polysilicon thin film portion and the aluminum thin film portion of the draw-out wires 74, 75, 76, 77, 96, 97, and 98 symmetrical, the size and the number of the terminal areas are made symmetrical. While the draw-out wires 74, 75, 76, 77, 96, 97, and 98 are polysilicon thin films in the present embodiment, by forming these draw-out wires 74, 75, 76, 77, 96, 97, and 98 with metal, the resistance value of the draw-out wires 74, 75, 76, 77, 96, 97, and 98 can be reduced, and the output from the bridge circuit composed of the temperature-difference-detecting resistors 72, 73, 93, and 94 can be made greater. Further, a large current flows through the heat element 92 so as to cause the heat element 92 to generate heat, and as a result, an equally large current flowing through the heat element 92 flows through the draw-out wire 78. In this way, the draw-out wire 78 generates heat, and the characteristics of the thermal flow measurement device are thus deteriorated; however, by forming the draw-out wire 78 with metal, such heat generation can be reduced.

Further, the intake-air temperature detecting resistor 90 and the fixed resistors 95 and 100 on the surface of the detection element 71 are also formed by conducting patterning on polysilicon thin film, and the individual resistors are connectable to the outside via the pads 81, 84, 85, 86, 87, 88, 101, and 102. Furthermore, the lengths of wires between the fixed resistor 100 and each of the pads 84, 85, 86, and 87 are different from one another, so that a fine adjustment of the resistance value of the fixed resistor 100 is enabled by selecting the pads 84, 85, 86, and 87. One of the pads 84, 85, 86, and 87 is connected to the pad 102, so that the heat element 92, the fixed resistor 99, the intake-air temperature-detecting resistor 90, and the fixed resistors 95 and 100 form a bridge circuit. This bridge circuit functions as a circuit for detecting the temperature of the heat element 92. Further, since the resistance of the fixed resistor 100 can be finely adjusted by selecting the pads 84, 85, 86, and 87 described above, it is possible to adjust the point of balance of the bridge circuit. In this way, the process variation of the heat element 92, the fixed resistor 99, the intake-air temperature-detecting resistor 90, and the fixed resistors 95 and 100 can be absorbed. Namely, by selecting the pads 84, 85, 86, and 87, the temperature of the heat element 92 can be adjusted so that the output from the bridge circuit becomes zero.

Further, based on the present detection part 71, utterly separate power supplies and grounds were used for the bridge circuit composed of the temperature-difference-detecting resistors 72, 73, 93, and 94 and for the bridge circuit composed of the heat element 92, the intake-air temperature-detecting resistor 90, and the fixed resistors 99, 100, and 95. In this way, the ground voltage of the bridge circuit composed of the temperature-difference-detecting resistors 72, 73, 93, and 94 was not influenced by a current flowing through the bridge circuit including the heat element 92 through which a large current flows.

Next, the driving circuit for activating the detection part 71 of the ninth embodiment will be described with reference to FIG. 18. The driving circuit comprises: a differential amplifier 112 for amplifying an output voltage from the bridge circuit composed of the heat element 92, the fixed resistor 99, the intake-air temperature-detecting resistor 90, and the fixed resistors 95 and 100 of the detection element 71; a transistor 111 that is controlled by an output from the differential amplifier 112 and that causes a current to flow through the heat element 92; and a differential amplifier 110 for amplifying an output voltage from the bridge circuit composed of the temperature difference detecting resistors 72, 73, 93, and 94 so as to output a sensor output.

The driving circuit controls a current flowing through the heat element 92, so that an output voltage from the bridge circuit composed of the heat element 92, the fixed resistor 99, the intake-air temperature detecting resistor 90, and the fixed resistors 95 and 100 becomes zero. Herein, the heat element 92, the intake-air temperature detecting resistor 90, and the fixed resistors 95 and 100 are formed of polysilicon thin films as described above, and the resistance of each of the resistors varies depending on the temperature of each of the resistors. Thus, while the output voltage from the bridge circuit varies depending on the resistance value of the heat element 92, the fixed resistor 99, the intake-air temperature detecting resistor 90, and the fixed resistors 95 and 100 and on the temperature of each of the resistors, the bridge circuit is designed so that output therefrom becomes zero when the temperature of the heat element 92 is different to a predetermined extent from the temperature of the intake-air temperature detecting resistor 90, by suitable selection of a value for each resistor. In this way, the driving circuit operates so that the temperature of the heat element 92 is different to a predetermined extent from the temperature of the intake-air-temperature-detecting resistor 90. Further, by detecting the temperature on both sides of the heat element 92 with the bridge circuit composed of the temperature-difference-detecting resistors 72, 73, 93, and 94 and then amplifying an output voltage from this bridge circuit with the differential amplifier 110, a sensor output that depends on air flow is obtained.

The invention claimed is:

1. A thermal flow measurement device, comprising:
    a heat element that is disposed in fluid and that generates heat when a current is caused to flow therethrough;
    a temperature-detecting resistor located near the heat element;
    a first wiring portion electrically connected to the temperature detecting resistor; and
    a second wiring portion electrically connected to the heat element,
    wherein the heat element and the temperature-detecting resistor are comprised of a polysilicon thin film, and
    the first wiring portion and the second wiring portion are comprised of silicide having a melting point of 2000° C. or higher, the silicide being formed of a metal thin film stacked on portions of the polysilicon thin film corresponding to the first wiring portion and the second wiring portion which have been thermally treated.

2. The thermal flow measurement device according to claim 1, wherein two pairs of wiring portions are electrically connected to the heat element.

3. The thermal flow measurement device according to claim 1, further comprising a protective film disposed over the polysilicon thin film and the metal thin film.

4. The thermal flow measurement device according to claim 3, wherein the protective film is selected from the group consisting of silicon oxide and silicon nitride.

5. The thermal flow measurement device according to claim 4, wherein the planar substrate is silicon.

6. The thermal flow measurement device according to claim 4, wherein the planar substrate is ceramic.

7. The thermal flow measurement device according to claim 1, wherein the metal thin film is comprised of a metal selected from the group consisting of tantalum, molybdenum, and tungsten.

8. The thermal flow measurement device according to claim 1, wherein the silicide is selected from the group consisting of tantalum silicide, molybdenum silicide, and tungsten silicide.

9. The thermal flow measurement device according to claim 1, further including a planar substrate and an insulating film formed on the planar substrate, wherein the polysilicon thin film is formed on the insulating film, and wherein the planar substrate has a diaphragm disposed in a portion of the planar substrate corresponding to the heat element and temperature detecting resistor.

10. The thermal flow measurement device according to claim 1, wherein the second wiring portion has a plurality of slits.

* * * * *